United States Patent
Peled et al.

(10) Patent No.: US 12,489,020 B2
(45) Date of Patent: Dec. 2, 2025

(54) END-TO-END MEASUREMENT FOR SEMICONDUCTOR SPECIMENS

(71) Applicant: Applied Materials Israel Ltd., Rehovot (IL)

(72) Inventors: Tomer Haim Peled, Ness-Ziona (IL); Bar Dubovski, Beit Hashmonay (IL); Noam Tal, Kiryat Ono (IL); Bobin Mathew Skaria, Bangalore (IN); Boris Levant, Rehovot (IL); Tal Frank, Tel Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 477 days.

(21) Appl. No.: 17/947,972

(22) Filed: Sep. 19, 2022

(65) Prior Publication Data
US 2024/0105522 A1    Mar. 28, 2024

(51) Int. Cl.
| | |
|---|---|
| *G01B 11/14* | (2006.01) |
| *G06F 18/214* | (2023.01) |
| *G06N 20/00* | (2019.01) |
| *G06T 7/10* | (2017.01) |
| *H01L 21/66* | (2006.01) |

(52) U.S. Cl.
CPC .......... *H01L 22/12* (2013.01); *G06F 18/214* (2023.01); *G06N 20/00* (2019.01)

(58) Field of Classification Search
USPC .............. 128/922, 924–925; 216/2–109; 382/141–159; 702/127–199; 703/1–23; 706/1–62
See application file for complete search history.

(56) References Cited

U.S. PATENT DOCUMENTS

| | | | | |
|---|---|---|---|---|
| 2009/0319075 A1* | 12/2009 | Tian | .................. | G01N 21/9501 700/121 |
| 2017/0351952 A1* | 12/2017 | Zhang | ..................... | G06N 3/04 |
| 2019/0049602 A1* | 2/2019 | Hench | ................... | G01N 23/201 |

(Continued)

FOREIGN PATENT DOCUMENTS

KR    20190100881 A    8/2019

OTHER PUBLICATIONS

Shaubi Ohad; Generating a Training Set Usable for Examination of a Semiconductor Specimen; 2019 (Year: 2019).*

(Continued)

*Primary Examiner* — Marcellus J Augustin
(74) *Attorney, Agent, or Firm* — Lowenstein Sandler LLP

(57) ABSTRACT

There is provided a system and method for examining a semiconductor specimen. The method includes obtaining a runtime image of the specimen, and providing the runtime image as an input to an end-to-end (E2E) learning model to process, thereby obtaining, as an output of the E2E learning model, runtime measurement data specific for a metrology application. The E2E learning model is previously trained for the metrology application using a training set comprising a plurality of training images of the specimen and respective ground truth measurement data associated therewith, and one or more cost functions specifically configured to evaluate, for the plurality of training images and corresponding training measurement data outputted by the E2E learning model, one or more metrology benchmarks from a group comprising precision, correlation, and matching.

20 Claims, 4 Drawing Sheets

(56) References Cited

U.S. PATENT DOCUMENTS

| | | | |
|---|---|---|---|
| 2021/0063329 A1* | 3/2021 | Kuznetsov | H01L 22/12 |
| 2021/0209418 A1* | 7/2021 | Badanes | G06V 10/809 |
| 2022/0036538 A1* | 2/2022 | Steiman | G06T 7/10 |
| 2023/0258446 A1* | 8/2023 | Moon | H01L 22/12 |
| | | | 702/155 |
| 2024/0053280 A1* | 2/2024 | Di | G01N 21/9501 |

OTHER PUBLICATIONS

Generating a Training Set Usable for Examination of a Semiconductor Specimen (Year: 2019).*

* cited by examiner

END-TO-END MEASUREMENT FOR SEMICONDUCTOR SPECIMENS

TECHNICAL FIELD

The presently disclosed subject matter relates, in general, to the field of examination of a semiconductor specimen, and more specifically, to metrology applications of the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized metrology system for examining a semiconductor specimen, the system comprising a first processing and memory circuitry (PMC) configured to: obtain a runtime image of the semiconductor specimen; and provide the runtime image as an input to an end-to-end (E2E) learning model to process, thereby obtaining, as an output of the E2E learning model, runtime measurement data specific for a metrology application. The E2E learning model is previously trained for the metrology application using i) a training set comprising a plurality of training images of the specimen and respective ground truth measurement data associated therewith; and ii) one or more cost functions specifically configured to evaluate, for the plurality of training images and corresponding training measurement data outputted by the E2E learning model, one or more metrology benchmarks from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools.

In addition to the above features, the system according to this aspect of the presently disclosed subject matter can comprise one or more of features (i) to (xii) listed below, in any desired combination or permutation which is technically possible:

(i). The E2E learning model is a single machine learning (ML) model configured to directly derive the runtime measurement data based on the runtime image, the single ML model usable to replace a plurality of processing modules used in a reference metrology system comprising an image preprocessing module, an image segmentation module, and a measurement module.

(ii). The runtime image is acquired by an electron beam tool, and a burst time of the electron beam tool used to capture the runtime image is reduced with respect to the burst time used for capturing an input image for the reference metrology system.

(iii). The training set comprises at least two sequences of training images acquired by at least two metrology tools. The one or more cost functions comprise a given cost function specifically configured to evaluate the matching between the at least two tools based on the training measurement data of the at least two sequences of training images.

(iv). Each sequence of the at least two sequences of training images is acquired by a respective metrology tool of the at least two metrology tools to capture a respective sequence of sites of the given feature on the specimen. The given cost function represents a difference between averaged measurement data of respective training measurement data of the at least two sequences of training images.

(v). The training set comprises a first subset and a second subset. The first subset comprises a first sequence of training images acquired by a metrology tool for one or more sites of the given feature on the specimen, and a second sequence of training images acquired by a different metrology tool for the same one or more sites after acquisition of the first sequence. The second subset comprises a first sequence of training images acquired by the different metrology tool for the one or more sites, and a second sequence of training images acquired by the metrology tool for the same one or more sites after acquisition of the first sequence. The given cost function represents a difference between training measurement data of corresponding training images in the two subsets.

(vi). The metrology application is one of Critical Dimension (CD) metrology, Overlay (OVL), Measurement-Based Inspection (MBI), Critical Dimension Uniformity (CDU), CAD Awareness (CADA), and Lithography process control.

(vii). The training set comprises one or more synthetic images simulated based on design data of the semiconductor specimen and ground truth measurement data automatically generated therefor.

(viii). The one or more synthetic images are generated by performing simulation based on the design data of the semiconductor specimen, giving rise to one or more simulated images, and performing augmentation on the simulated images, thereby simulating one or more physical effects of one or more physical processes of the specimen.

(ix). The ground truth data comprises one or more of measurement data generated by processing the training images using a reference metrology system comprising multiple processing modules, measurement data obtained from a customer based on a testing specimen, and measurement data automatically generated for simulated images.

(x). The PMC is further configured to provide interpretability with respect to the runtime measurement data.

(xi). The interpretability is provided by a heatmap visually representing a correlation of pixel contribution of the runtime image and the runtime measurement data.

(xii). The E2E learning model is a multi-task learning model directed to multiple metrology applications.

In accordance with other aspects of the presently disclosed subject matter, there is provided a computerized metrology method for examining a semiconductor specimen, the method comprising: obtaining a runtime image of the semiconductor specimen; and providing the runtime image as an input to an end-to-end (E2E) learning model to process, thereby obtaining, as an output of the E2E learning model, runtime measurement data specific for a metrology application. The E2E learning model is previously trained for the metrology application using i) a training set comprising a plurality of training images of the specimen and respective ground truth measurement data associated therewith; and ii) one or more cost functions specifically configured to evaluate, for the plurality of training images and corresponding training measurement data outputted by the E2E learning model, one or more metrology benchmarks from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools.

In accordance with other aspects of the presently disclosed subject matter, there is provided a computerized method comprising: generating a training set comprising a plurality of training images of a semiconductor specimen and respective ground truth measurement data associated therewith pertaining to a metrology application; and training an end-to-end (E2E) learning model for the metrology application using the training set and one or more cost functions, the one or more cost functions specifically configured to evaluate, for the plurality of training images and corresponding training measurement data outputted by the E2E learning model, one or more metrology benchmarks from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools, wherein the E2E learning model, upon being trained, is usable for processing a runtime image of the semiconductor specimen and obtaining runtime measurement data specific for the metrology application.

This aspect of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized metrology method for examining a semiconductor specimen, the method comprising: obtaining a runtime image of the semiconductor specimen; and providing the runtime image as an input to an end-to-end (E2E) learning model to process, thereby obtaining, as an output of the E2E learning model, runtime measurement data specific for a metrology application. The E2E learning model is previously trained for the metrology application using i) a training set comprising a plurality of training images of the specimen and respective ground truth measurement data associated therewith; and ii) one or more cost functions specifically configured to evaluate, for the plurality of training images and corresponding training measurement data outputted by the E2E learning model, one or more metrology benchmarks from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools.

In accordance with other aspects of the presently disclosed subject matter, there is provided a non-transitory computer readable medium comprising instructions that, when executed by a computer, cause the computer to perform a computerized method comprising: generating a training set comprising a plurality of training images of a semiconductor specimen and respective ground truth measurement data associated therewith pertaining to a metrology application; and training an end-to-end (E2E) learning model for the metrology application using the training set and one or more cost functions, the one or more cost functions specifically configured to evaluate, for the plurality of training images and corresponding training measurement data outputted by the E2E learning model, one or more metrology benchmarks from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools; wherein the E2E learning model, upon being trained, is usable for processing a runtime image of the semiconductor specimen and obtaining runtime measurement data specific for the metrology application.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
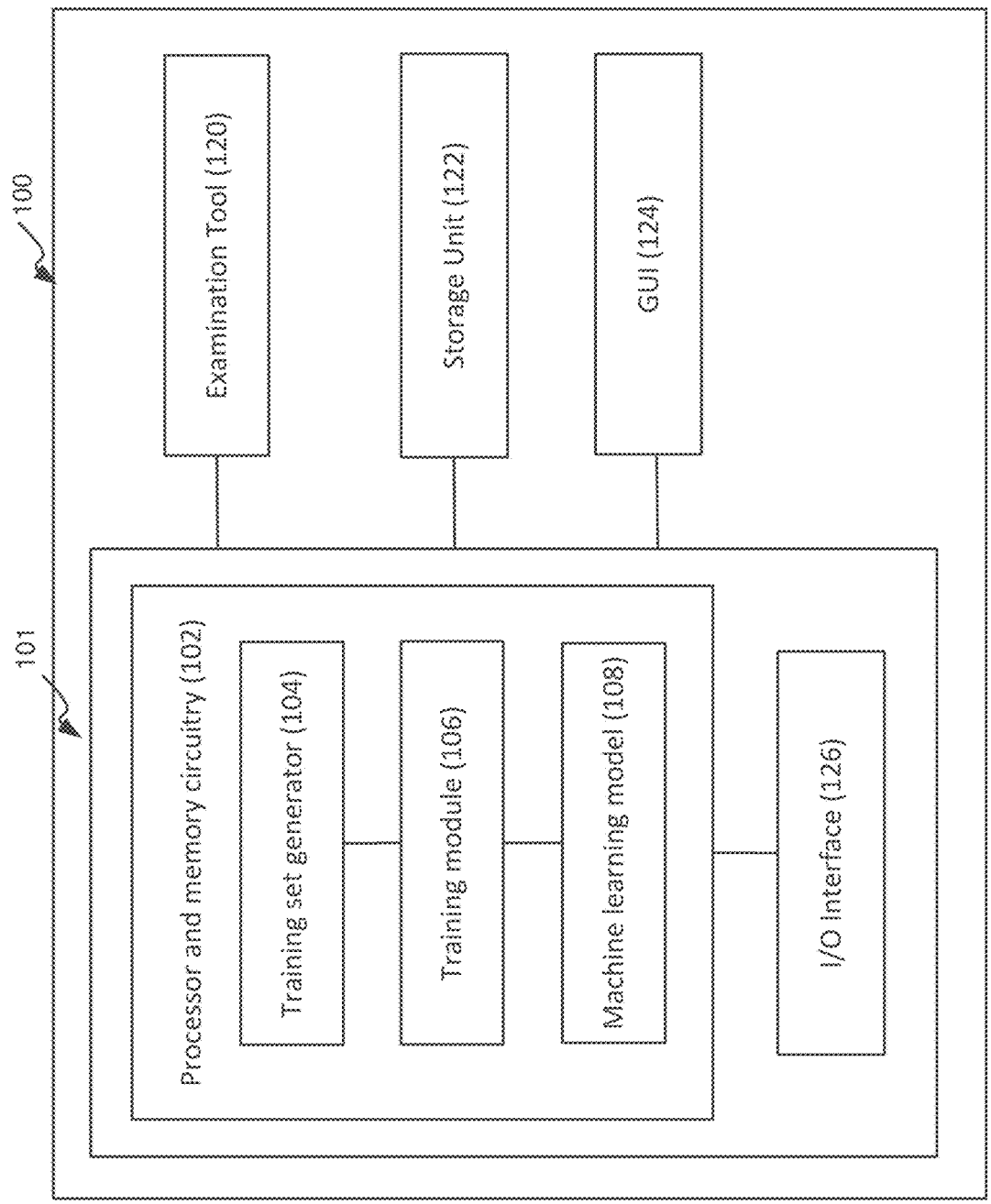
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "examining", "providing", "training", "simulating", "performing", "generating", "processing", "using", "providing", "representing", "measuring", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the metrology system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, such as, e.g., critical dimension (CD) measurements, overlay, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

In some embodiments, at least one of the examination tools 120 has metrology capabilities and can be configured to capture images and perform metrology operations on the captured images. Such an examination tool is also referred to herein as a metrology tool.

According to certain embodiments, the metrology tool can be an electron beam tool, such as, e.g., scanning electron microscopy (SEM). SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately measuring features during the manufacture of semiconductor wafers. By way of example, the metrology tool can be critical dimension scanning electron microscopes (CD-SEM) used to measure critical dimensions of structural features in the images.

It is to be noted that, the term images in either "runtime images" or "training images" used herein can refer to original images of the specimen captured by the examination tool during the manufacturing process, derivatives of the captured images obtained by various pre-processing stages, and/or computer-generated design data-based images. It is to be noted that in some cases the images referred to herein can include image data (e.g., captured images, processed images, etc.) and associated numeric data (e.g., metadata, hand-crafted attributes, etc.). It is further noted that image data can include data related to one or more of the following: a processing step of interest, a layer of interest, a plurality of processing steps and/or a plurality of layers of the specimen.

According to certain embodiments of the presently disclosed subject matter, the examination system 100 comprises a computer-based system 101 operatively connected to the examination tools 120 and capable of enabling automatic metrology operations with respect to a semiconductor specimen in runtime based on runtime images obtained during specimen fabrication. System 101 is also referred to as a metrology system.

The process of semiconductor manufacturing often requires multiple sequential processing steps and/or layers, each one of which could possibly cause errors that may lead to yield loss. Metrology operations can be performed at various processing steps during the manufacturing process to monitor and control the process. By way of example, metrology operations can be used to measure one or more characteristics of the specimen, such as, e.g., CD measurements (e.g., line width, thickness, etc.) of features formed on the specimen during a processing step such that the performance of the processing step can be evaluated based on the measurements. For instance, if some of the measurements of the specimen are unacceptable (e.g., exceeding a predetermined range or threshold), such measurements may be used to alter one or more parameters of the processing step such that subsequent specimens manufactured by the processing step can have acceptable characteristics.

Conventionally, a metrology system typically comprises a chain/pipeline of multiple processing modules which are sequentially connected one to another in order to processing captured images of a specimen and derive measurements thereof. Each of the multiple modules is configured for a specific task. By way of example, the multiple processing modules can include, but not limited to, e.g., image-preprocessing module(s), image segmentation module(s) and measurement module(s). In some cases, at least part of the processing modules, such as, e.g., the image segmentation modules, are machine learning based. The final measurements, as the output of the measurement modules, are then evaluated with certain metrology benchmarks (which can be predetermined by customers).

It is challenging to tune such a multi-stage processing system during recipe setup. For achieving better performance, optimization of the inner/intermediate layers of modules and their respective parameters has to be applied. However, as each layer is responsible to solve a particular task, and the metrology benchmarks are only evaluated with respect to the final output of the measurement modules, there is not enough actionable information regarding how the evaluation results should be correlated to adjust the intermediate modules, and how such optimization would, in turn, affect the system performance as a whole. The tuning and optimization of parameters in such modules heavily relies on users/operators' judgmental decisions, based on their experience and intuition, which may result in a metrology system with undesired performance.

Accordingly, certain embodiments of the presently disclosed subject matter propose to use an end-to-end (E2E) learning model to replace the previous multiple processing modules, which, upon being trained, can directly process the specimen images and provide measurements thereof. The proposed E2E based system significantly reduces the complexity of system architecture, minimizes user dependency and intervention, and enables direct optimization of the learning model based on the benchmark evaluation, thereby effectively improving the measurement performance, as will be detailed below.

Specifically, system 101 includes a processor and memory circuitry (PMC) 102 operatively connected to a hardware-based I/O interface 126. The PMC 102 is configured to provide processing necessary for operating the system, as further detailed with reference to FIGS. 2-4, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments of the presently disclosed subject matter, system 101 can be a metrology system configured to perform metrology operations using a trained machine learning (ML) model based on runtime images obtained during specimen fabrication. In such cases, one or more functional modules comprised in the PMC 102 of system 101 can include a machine learning (ML) model 108 that was previously trained for a metrology application. The ML model can be implemented as an end-to-end (E2E) learning model.

Specifically, the PMC 102 can be configured to obtain, via an I/O interface 126, a runtime image of the semiconductor specimen, and provide the runtime image as an input to an E2E learning model (e.g., the ML model 108) to process, thereby obtaining, as an output of the E2E learning model, runtime measurement data specific for the metrology application. In such cases, the ML model 108 can be regarded as being comprised in a measurement module (not illustrated in FIG. 1) as part of a metrology recipe usable for performing metrology operations on acquired runtime images. System 101 can be regarded as a metrology system capable of performing runtime metrology operations using the metrology recipe. Details of the runtime examination process are described below with reference to FIG. 3.

In some embodiments, system 101 can be configured as a training system capable of training the ML model during a training/setup phase using a specifically generated training set and cost functions. In such cases, one or more functional modules comprised in the PMC 102 of system 101 can include a training set generator 104, a training module 106 and a ML model 108. Specifically, the training set generator 104 can be configured to generate a training set comprising a plurality of training images of the specimen and respective ground truth measurement data associated therewith. The training module 106 can be configured to train the ML model 108 using the training set and one or more cost functions. The cost functions can be specifically configured to evaluate, for the plurality of training images and corresponding training measurement data outputted by the E2E learning model, one or more metrology benchmarks such as, e.g., precision, correlation and/or matching etc. Precision refers to repeatability of training measurement data of different training images acquired for a given feature on the specimen (acquired by the same metrology tool). Correlation refers to relationship between training measurement data of the training images and the respective ground truth measurement data associated therewith. Matching is with respect to repeatability of training measurement data of different training images acquired for the given feature by different metrology tools.

As described above, the ML model, upon being trained, is usable for processing a runtime image, and obtaining runtime measurement data specific for a metrology application. Details of the training process are described below with reference to FIGS. 2 and 4.

According to certain embodiments, the ML model can be trained for different metrology applications, based on specific training images and ground truth data pertaining to respective applications. Various applications that can be applicable using the present disclosure include, but not limited to, the following: an overlay application, a critical dimension (CD) metrology application, etc., as detailed below.

Operation of systems 100 and 101, the PMC 102, and the functional modules therein will be further detailed with reference to FIGS. 2-4.

According to certain embodiments, the ML model 108 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type of learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a ML model can be initially selected prior to training, and can be further iteratively adjusted or modified during training to achieve an optimal set of weighting and/or threshold values in a trained model. A set of input data used to adjust the weights/thresholds of a ML model is referred to as a training set. Details of the training process are described below with reference to FIG. 2.

It is noted that the teachings of the presently disclosed subject matter are not bound by specific architecture of the ML or DNN as described above.

In some cases, additionally to system 101, the examination system 100 can comprise one or more examination modules, such as, e.g., defect detection module, Automatic Defect Review Module (ADR), Automatic Defect Classification Module (ADC), additional a metrology-related module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101 can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime images, the training set, as described above. Accordingly, these input data can be retrieved from the storage unit 122 and provided to the PMC 102 for further processing. The output of the system 101, such as the trained ML model, and/or measurement data, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the measurement data, the evaluation results of the metrology benchmarks, etc., on the GUI. In some cases, system 101 can be further configured to send certain output to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. For instance, the examination tool 120 and the system 101 can be located at the same entity (in some cases hosted by the same device) or distributed over different entities.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
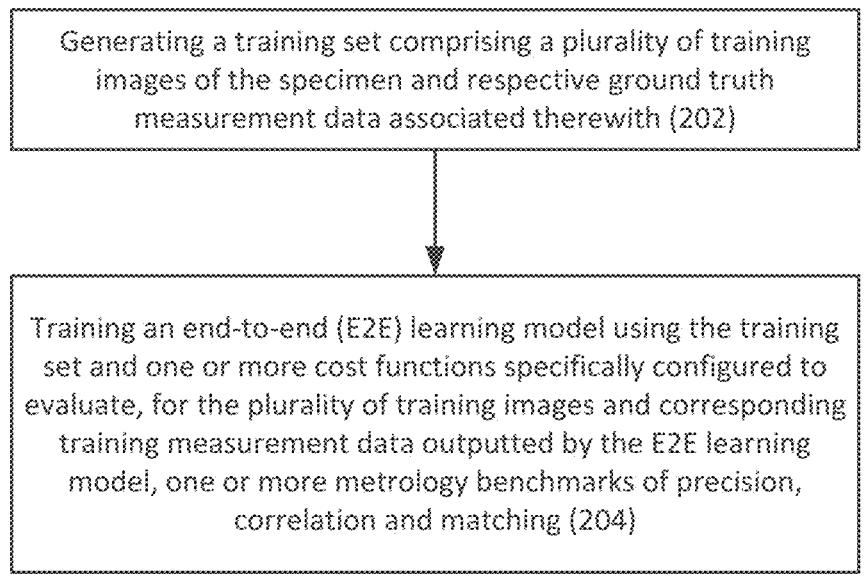
FIG. 2 illustrates a generalized flowchart of training a machine learning model usable for a metrology application of a semiconductor specimen in accordance with certain embodiments of the presently disclosed subject matter.
Figure 3:
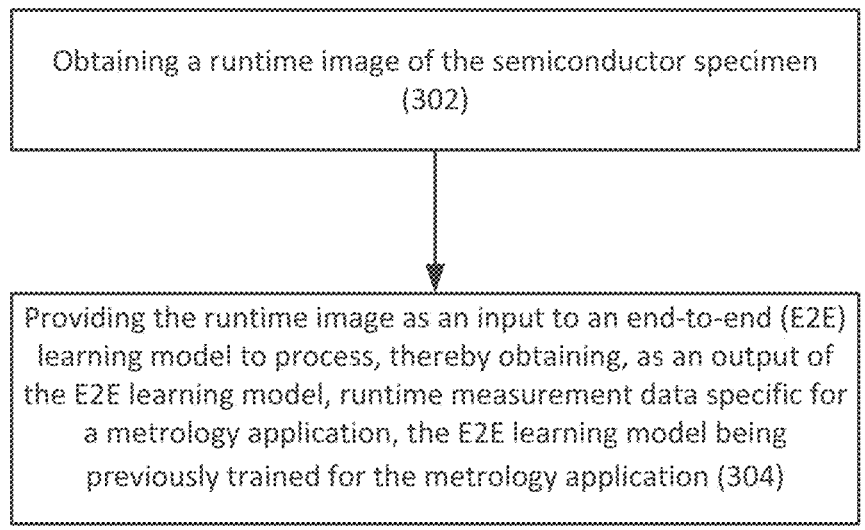
FIG. 3 illustrates a generalized flowchart of runtime examination of a semiconductor specimen using a trained ML model for a metrology application in accordance with certain embodiments of the presently disclosed subject matter.
Figure 4:
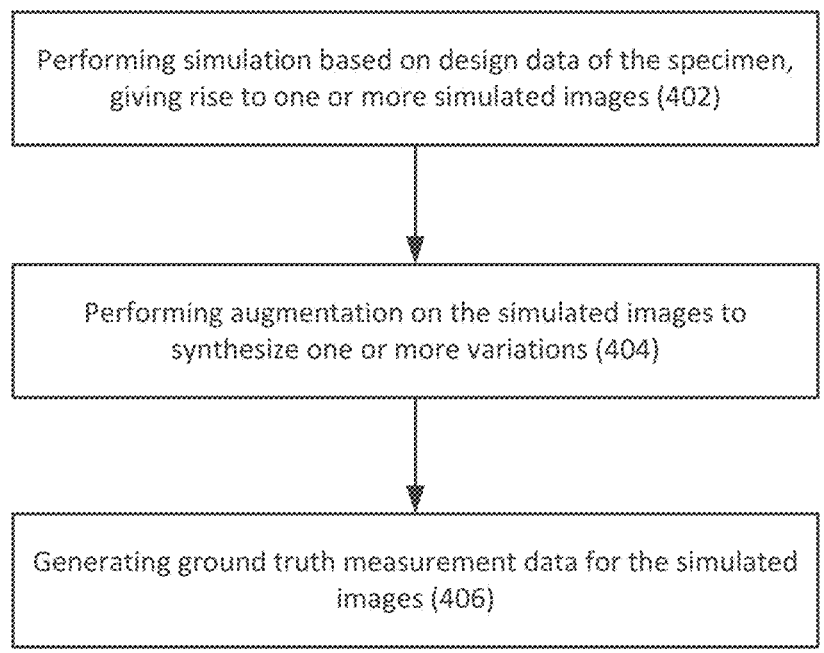
FIG. 4 illustrates a generalized flowchart of generating synthetic images and ground truth measurement data associated therewith in accordance with certain embodiments of the presently disclosed subject matter.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring to FIG. 2, there is illustrated a generalized flowchart of training a machine learning model usable for a metrology application of a semiconductor specimen in accordance with certain embodiments of the presently disclosed subject matter.

As described above, the ML model used herein refers to an end-to-end (E2E) learning model. An E2E learning model used herein refers to a single ML model configured to directly derive measurement data based on an input image of a specimen, thereby replacing a plurality of processing modules (e.g., bypassing one or more intermediate modules) which were used in a reference metrology system (e.g., a conventional metrology system) to obtain the measurement data.

A metrology application refers to what a customer/user is interested to measure in general with respect to the specimen. By way of non-limiting example, a metrology application can be selected from a group of metrology applications comprising: Critical Dimension (CD) metrology, Overlay (OVL), Measurement-Based Inspection (MBI), Critical Dimension Uniformity (CDU), CAD Awareness (CADA), and Lithography process control.

CD metrology refers to measuring the critical dimensions of the fine patterns formed on a semiconductor wafer. The CD measurements include, but are not limited to, the following: dimensions (e.g., line widths, line spacing, contact diameters, size of the element, edge roughness, gray level statistics, etc.), shapes of elements, distances within or between elements, related angles, etc. Overlay refers to measurement of an overlay shift between multiple layer patterns. One example of overlay can be to find the nominal overlay error between two layers on the edge of the wafer. MBI refers to defect inspection using measurement. One example of MBI can be detection of etch residue at the bottom of a trench. CDU refers to uniformity measurement related to critical dimension. One example of CDU can be to create a uniformity map of the offset between two contacts. CADA refers to the integration of CAD into SEM-based defect inspection. Lithography process control refers to control of a lithography tool and material roughness.

Figure 5:
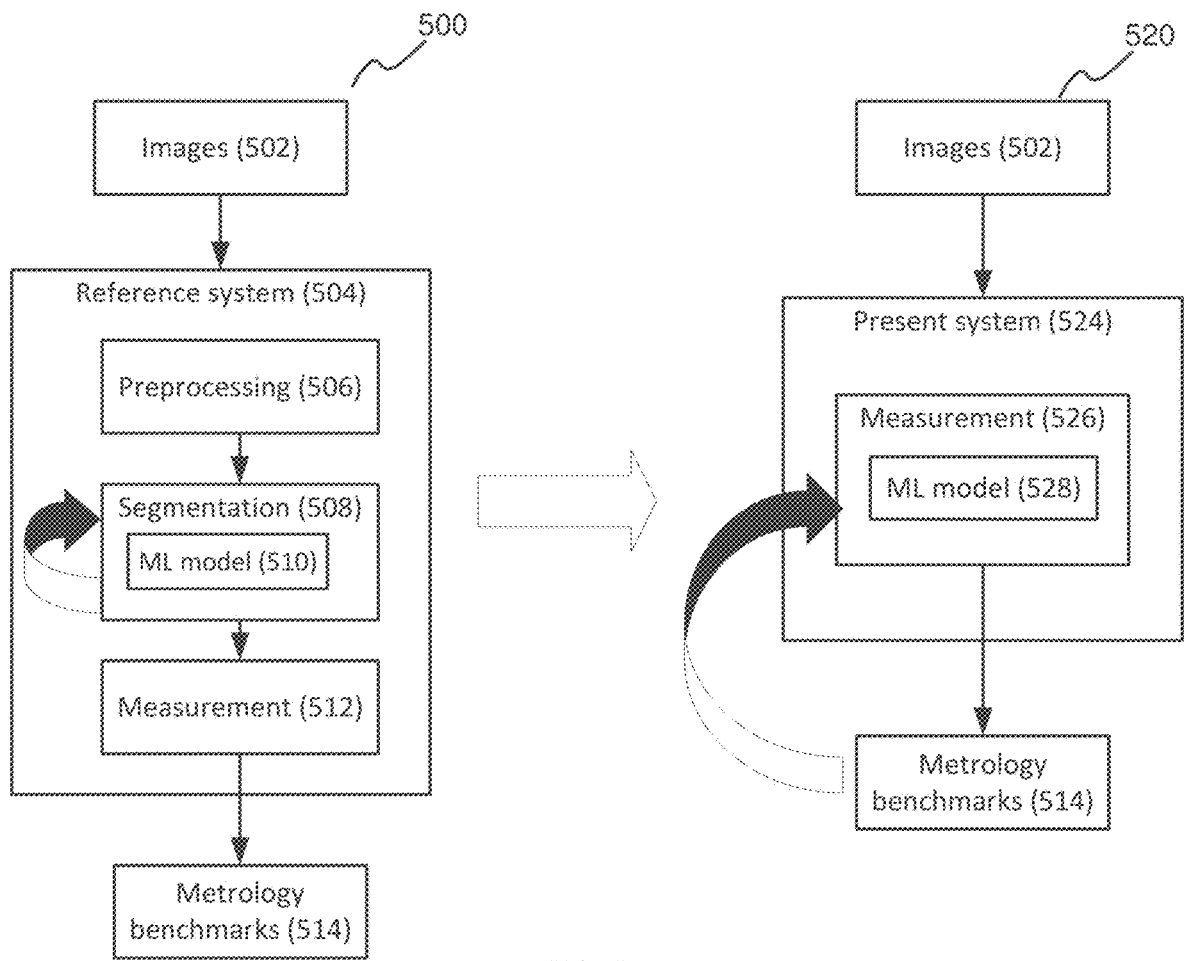
FIG. 5 schematically illustrates an example of a reference metrology system and a presently proposed metrology system based on E2E learning in accordance with certain embodiments of the presently disclosed subject matter.

Turning now to FIG. 5, there are schematically illustrated an example of a reference metrology system and a presently proposed metrology system based on E2E learning in accordance with certain embodiments of the presently disclosed subject matter.

The diagram 500 exemplifies a reference metrology system 504 (also referred to as a legacy metrology system) which comprises a pipeline of multiple processing modules, including an image preprocessing module 506, an image segmentation module 508 and a measurement module 512. The image preprocessing module 506 can be configured to perform one or more of the following operations: image enhancement (e.g., denoising, sharpening, contrast enhancement etc.), image normalization, image registration, etc., for purpose of enhancing the quality of the input images 502.

The preprocessed images are fed into the next processing module, i.e., the image segmentation module 508, to be segmented. The term "image segmentation" used herein may refer to any process of partitioning an image into meaningful parts/segments (for example, background and foreground, noisy and non-noisy areas, various structural elements, defect and non-defect, etc.) whilst providing per-pixel or per-region values indicative of such segments. In some cases, the image segmentation can be based on machine learning. In such cases, the image segmentation module 508 can be regarded as comprising a segmentation ML model 510.

By way of example, the segmentation ML model 510 can be configured to segment the input image according to one or more structural elements presented in the image. A structural element used herein can refer to any original object on an image that has a geometrical shape or geometrical structure with a contour, or a combination of such objects. The output of the segmentation ML model 510 can be, for instance, a segmentation map in which the value of each pixel/element is indicative of a predicted probability of a corresponding pixel in the image to correspond/belong to the structural elements in the image, or, say, to belong to one or more segments representative of the structural elements in the image. The segmentation map is applied on the input image (e.g., the preprocessed image), resulting in a segmented image.

The segmented image can be provided to the next processing module, i.e., the measurement module 512, for obtaining measurement data, such as, e.g., overlay, CD measurements, etc. By way of example, the measurement module 512 can be configured to obtain CD measurements (e.g., width, length, distance, diameter, etc.) in accordance with the contours of the structural elements as indicated in the segmented image.

As described above, tuning such a multi-layer metrology system 504 can be difficult. By way of example, during setup, the measurement data as outputted the measurement module 512 is evaluated based on one or more metrology benchmarks 514 (such as precision, correlation, matching, etc.). Based on the evaluation result, it is needed to determine how to optimize each of the multiple processing modules and update respective parameters thereof. However, as each module is configured for a respective functionality, it is hard to determine how the evaluation results should be correlated to each module (including the intermediate modules 506 and 508, and the output module 512), and how the optimization of each module would in turn affect the system performance as a whole. The tuning and optimization of parameters in such modules thus heavily relies on users/operators' judgmental decisions based on their experience and intuition, which may result in a metrology system with less ideal performance.

In particular, in such a metrology system which comprises an image segmentation module 508, the quality of the measurement data largely depends on the performance of the image segmentation module which delivers critical information on the shapes and dimensions of the structural elements in the images. Image segmentation is known to be a challenging task in itself, due to various affecting factors, such as the amount and/or quality of the training data, the architecture of segmentation network(s) used in such modules, the training process thereof etc. Significant efforts and computation resources are usually invested for tuning and optimizing the segmentation module, which are somehow not directly correlated to the metrology benchmark evaluation of the measurement data, thus may or may not eventually contribute to improvement of the measurement performance.

In comparison, the diagram 520 exemplifies a present metrology system 524 as currently proposed according to certain embodiments of the present disclosure. As shown, the system 524 comprises only a measurement module 526, without the intermediate modules as included in the reference system 504. Specifically, the measurement module 526 includes a ML model 528, such as the E2E learning model as described above. The input images 502 of a specimen are directly fed into the ML model 528 and the output therefrom is measurement data derived by the ML model from the images.

During training, the training measurement data as outputted the ML model 528 is evaluated based on the metrology benchmarks 514 (such as precision, correlation, matching, etc.), and the ML model 528 is directly optimized based on the evaluation result. Using the E2E learning approach, a single ML model replaces the aforementioned chain of processing modules, thereby allowing using a single optimization criterion directly correlated to the metrology benchmarks, instead of each of the multiple modules being optimized separately under different criteria in the previous approach. Such system architecture is straightforward with reduced complexity, enables direct optimization, minimizes the necessity of user intervention, and effectively improves the measurement performance.

For training the ML model 528, sufficient training data is required. Referring back to FIG. 2, a training set can be generated (202) (e.g., by the training set generator 104 in PMC 102), comprising a plurality of training images of a semiconductor specimen and respective ground truth measurement data associated therewith pertaining to the metrology application.

A training image can be a "real world" image of a semiconductor specimen obtained by an examination tool during a fabrication process thereof. Ground truth data is application specific. For instance, in cases where the metrology application is a CD measurement application, the ground truth measurement data can be representative of the actual/true CD measurements derived from the training images.

In some embodiments, the ground truth measurement data can comprise one or more of the following: measurement data generated by processing the training images using a reference metrology system (such as the reference metrology system 504 in FIG. 5 comprising multiple processing modules such as image preprocessing, image segmentation, and measurement, etc.), measurement data obtained from a customer based on a testing specimen (or a target in cases of a overlay application), and measurement data automatically generated for simulated images.

For purpose of providing a well-trained, accurate model that is robust with respect to process variations in actual production, training images must be sufficient in terms of quantity, quality and variance, etc., and the images need to be annotated with accurate measurement labels. However, in some cases, such training data can be difficult to collect. For instance, training images of the specimens to be examined may be unavailable during the setup phase, or may be very limited and do not include sufficient process variations of structural parameters. In particular, in the FAB environment, it may be challenging to obtain ground truth data for the images which typically takes time and effort, and in some cases may be error prone. In some cases, a reference tool, such as, e.g., X-Section TEM, is needed, which may be destructive to the specimen.

In some embodiments, in addition to the "real world" training images, the training set used to train the ML model can be enriched by one or more synthetic images simulated for the semiconductor specimen and ground truth measurement data automatically generated therefor.

Turning now to FIG. 4, there is illustrated a generalized flowchart of generating synthetic images and ground truth measurement data associated therewith in accordance with certain embodiments of the presently disclosed subject matter.

Image simulation can be performed (402) based on design data of a specimen, giving rise to one or more simulated images. The design data can refer to the original design layout data of the specimen, such as CAD data, as obtained from a customer. Alternatively, the design data can refer to simulated design data generated based on image data of the specimen. By way of example, a SEM image of the specimen can be analyzed and feature extraction can be performed on the SEM image. For instance, the extracted features can include one or more measurements with respect to certain structural elements, features representative of the structure and/or pattern of the structural elements, such as, e.g., edges, corners, pixel intensities, etc. The extracted features can be used to simulate a design image (e.g., simulated CAD image) corresponding to the SEM image.

Upon obtaining the design data for the specimen, image simulation can be performed based on the design data to simulate one or more effects caused by one or more physical processes of the semiconductor specimen. According to certain embodiments, the effects can refer to variations caused by one or more of the following physical processes: manufacturing/fabrication process (e.g., printing the design patterns of the specimen on the wafer by a lithography tool), scanning process and signal processing process in the examination tool, etc., as will be described in further detail below.

By way of example, effects caused by the fabrication process can be simulated. The simulated images represent how the design patterns in the design images would actually appear on the wafer. In other words, the simulation transfers the design intent layout to the expected processed pattern on the wafer. Such simulation is also referred as stepper simulation, and can be performed, e.g., by convolving the CAD data (e.g., in the form of rasterized CAD) with a stepper beam shape filter. The stepper simulation assumes a Gaussian shape of the stepper optical beam. For example, the patterns on the wafer can be defined as thresholding of convolution of the binary CAD image with a Gaussian filter simulating the stepper optical beam shape. In some cases, process variation (PV) can be considered during such simulation. Process variation can refer to variations caused by a change in the fabrication process of the specimen. By way of example, the fabrication process may cause slight shifting/scaling/distortion of certain structures/patterns between different images which results in pattern variation in the images. By way of another example, the fabrication process may cause thickness variation of the specimen, which affects reflectivity, thus in turn affecting gray level of the resulting image. For instance, die-to-die material thickness variation can result in a different reflectivity between two of the dies, which leads to a different background gray level value for the images of the two dies.

In some cases, optionally, effects caused by the scanning process of the examination tool can be simulated in addition to the effects caused by the fabrication process as described above. The scanning process refers to the process when the specimen is scanned by the examination tool, thereby generating an examination signal. The simulated images are representative of the examination signal as generated by yield of electrons from the specimen and prior to entering the detector for further signal processing. By way of example, the specimen can be scanned by a SEM beam of a SEM tool, thereby obtaining a SEM signal which enters the SEM detector. The present simulation, in such cases, aims to simulate the SEM signal entering the SEM detector. As known, a SEM beam has a Gaussian shape. For instance, the SEM signal can be obtained by a convolution of wafer Electron Yield (represented by a signal from hypothetic zero width electron beam) with the SEM beam (represented by a SEM point spread function (PSF)). The wafer Electron Yield can be defined based on wafer topography as presented on the first simulated images. For simplicity, in some cases, it can be recognized that the wafer Electron Yield is proportional to the patterns of the wafer topography on the first simulated images and is related to the material properties of the patterns.

In some cases, optionally, effects caused by the signal processing process of the examination tool can be simulated in addition to the effects caused by the fabrication process and/or the effects caused by the scanning process as described above. The signal processing process refers to the signal processing path where the examination signal (e.g., the SEM signal) is processed by the signal processing module in the examination tool, giving rise to an output examination image (e.g., SEM image). The simulation reflects influence of the signal path on both signal and noise. In some cases, it can be based on a generalized theory that unifies stochastic, deterministic, continuous, and discrete behaviors.

It is to be noted that the above exemplified effects can be simulated separately or in combination, and the present disclosure is not limited to how the simulation is specifically performed based on the design data. By way of example, in cases where the specimen is examined by a SEM tool, the simulated images resulting from simulating one or more of the above effects are simulated SEM images.

In some embodiments, optionally, image augmentation can be performed (304) on the simulated images to further simulate/synthesize one or more variations representing physical effects/phenomena of the fabrication process and/or the examination process. Generally speaking, augmentation of an image can be provided by various image processing techniques including adding noise, blurring, geometric transformation (e.g., rotating, stretching, simulating different angles, cropping, scaling, etc.), tone mapping, changing vector information of one or more pixels of the image (e.g., adding and/or modifying perspectives or channels of acquisition, etc.), etc.

By way of example, gray level variations can be caused by physical effects of the examination process of the specimen. By way of example, gray levels of images, taken by different examination tools, can differ by a factor, even when captured at the same location of the same wafer with the same resolution. This can be caused by, e.g., different physical configurations and calibrations of the examination tools/detectors etc. Additionally, gray level of images taken from different locations of the wafer can also vary. Thus, training a ML model based on the images captured by a tool other than a tool that captures runtime images, and/or based on images captured for different locations of a wafer, can deteriorate generalization capabilities of the ML model.

Therefore, gray level intensities in the images can be adjusted for simulating such effect. By way of example, for an image, a pixel value histogram of the image patch can be generated, and a gray level bias number can be randomly selected within a bias range and can be applied to the histogram. The training set comprising such augmented images will enable increased robustness to tool variations and reduce the necessity of collecting training data from multiple tools. By way of another example, the gray level intensities of an image can also be adjusted by changing the contrast of the image patch. For instance, the pixel value histogram of the image patch can be stretched for getting a better contrast.

According to further embodiments, gray level variations can include Color variation (CV). Color variation can occur within a single image (e.g., due to layer thickness variations) or between a runtime image and a training image. CV can stem from different tool calibration and can be characterized by a local change of gray levels (GL) in the image. For addressing such an effect, the original image can be augmented to have different desired levels of added variations. Thus, the training set comprising such augmented images will enable increased robustness to the color variations in the runtime images.

Additionally or alternatively, other possible effects of a physical process that can be simulated/synthesized can include, but are not limited to: noise (e.g., each gray level intensity contains a different scale of noise intensity), focusing errors (e.g., some patterns are more sensitive to focusing errors than others), charging effects (which may create artificial differences between runtime and reference images and can substantially affect examination processes), calibration of quad detectors (which may be suboptimal, resulting in images with overlap within different perspectives) etc.

It is to be noted although the image simulation (with reference to block 402) and augmentation (with reference to block 404) are illustrated as two separate steps in FIG. 4, in some cases, augmentation can be regarded as part of the image simulation process, as they are both performed for the purpose of simulating various effects/variations caused by one or more physical processes of the semiconductor specimen such as fabrication process, examination process, etc. In such cases, the image augmentation can also be regarded as an optional step, as the functionality thereof can be integrated in the image simulation process.

Upon generating the simulated images (with or without augmentation), ground truth measurement data can be generated (406) for the simulated images. Since the images are simulated based on design data which are typically associated with respective ground truth data of the structural elements thereof, the simulated images corresponding to the design data can also be associated with the respective ground truth data.

In some cases, optionally, it is possible to vary the size of the structural elements in the original design data to different scales, thereby generating additional design data associated with different measurement data (with different scales/sizes). Accordingly, additional simulated images can be generated corresponding to the additional design data and associated with different ground truth measurement data.

Referring back to FIG. 2, once the training set is generated (with or without the synthetic training images), the ML model (e.g., the E2E learning model) can be trained (204) (e.g., by the training module 106) using the training set and one or more cost functions.

As described above, the weighting and/or threshold values of the ML model can be initially selected prior to training, and can be further iteratively adjusted or modified during training to achieve an optimal set of weighting and/or threshold values in a trained ML model. After each iteration, depending on a specific cost function, a difference can be determined between the actual output produced by the ML model and the target output associated with the respective training data. The difference can be referred to as an error value. Training can be determined to be complete when one or more cost functions indicative of one or more error values are less than respective predetermined values, or when a limited change in performance between iterations is achieved.

The one or more cost functions can be specifically configured to evaluate one or more metrology benchmarks for the plurality of training images and corresponding training measurement data outputted by the E2E learning model. The one or more metrology benchmarks can be selected from the following: precision, correlation, matching, etc.

Precision refers to the closeness of agreement between independent measurements (by the same metrology tool) on the same feature of the same area/site of a specimen. By way of example, high precision indicates that the independent measurements of the same feature are repeatable (i.e., the measurements have small variance with one another and the measurement distribution is relatively close). In some embodiments, precision can be regarded as measurement repeatability. In some other embodiments, precision can comprise two components: repeatability and reproducibility. Repeatability refers to a measure of measurement result distribution, where consecutive measurements are conducted repeatedly on the same site of the specimen, without any operator intervention. The cause for variation within repeated measurements results can be mainly due to the statistical nature of the tool signal (e.g., SEM signal), and the interpretation of the new set of signals by the measurement algorithm as comprised in the recipe. Reproducibility refers to another measure of measurement result distribution, where the measurements are obtained from different sites of the same specimen at different times. It accounts for the other sources of variation between independent measurements: wafer alignment, SEM autofocus, pattern recognition, tool stability etc.

When evaluating the ML performance with respect to the training data, precision can indicate the repeatability of training measurement data of different training images acquired for a given feature (e.g., a structural feature from a given area/site of the specimen, or the same type of features from different areas/sites of the specimen) on the specimen by one metrology tool.

A cost function can be configured to evaluate the criterion of precision. By way of example, the cost function can be related to a precision score obtained by calculating variance between the training measurement data of different training images based on a precision measure. An example of calculating a precision score is described in "CD-SEM Precision—Improved Procedure & Analysis", Proc. SPIE 3677, Metrology, Inspection, and Process Control for Microlithography XIII, which is incorporated herein in its entirety by reference.

Matching refers to the metrology metric/benchmark representative of measurement variance between different tools, therefore is also referred to as tool-to-tool matching. Matching is thus with respect to repeatability of training measurement data of different training images of the same given feature acquired by different metrology tools. In order to evaluate such benchmarks, training images acquired by different metrology tools should be collected during the training data collection/preparation stage (e.g., the examination tools 120 may comprise multiple metrology tools). A cost function for evaluating the criterion of matching can be similarly configured as described above, e.g., by calculating a difference between the training measurement data of different training images acquired by different metrology tools based on a matching measure.

Correlation refers to the relationship between training measurement data of the training images and the respective ground truth measurement data associated therewith. A cost function for evaluating the criterion of correlation can be configured to represent the discrepancy between the training measurement data and the respective ground truth measurement data.

Figure 6:
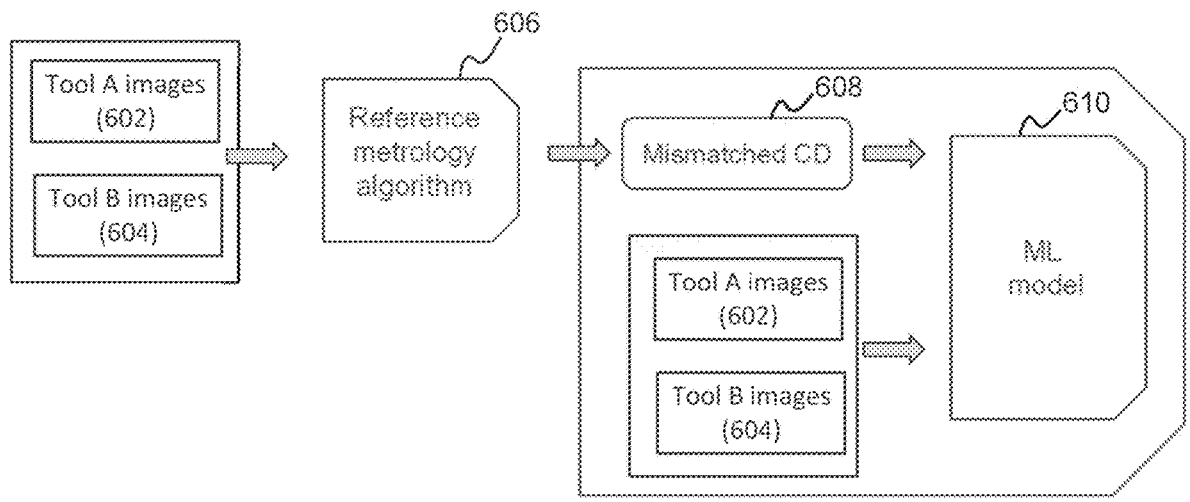
FIG. 6 schematically illustrates an example of training the ML model for tool-to-tool matching in accordance with certain embodiments of the presently disclosed subject matter.

Referring to FIG. 6, there is schematically illustrated an example of training the ML model for tool-to-tool matching in accordance with certain embodiments of the presently disclosed subject matter.

As shown, one or more training images 602 of a given feature (e.g., contacts) on a specimen are acquired by a metrology tool A, and one or more training images 604 of the same feature are acquired by a different metrology tool B. The training images 602 and 604 can be respectively processed by a reference metrology algorithm 606, such as, e.g., the legacy algorithm used in the reference metrology system 504 as described above with reference to FIG. 5, thereby obtaining respective measurement data thereof. Mismatched CD 608 as illustrated in FIG. 6 can represent the respective measurement data of the training images 602 and 604, and/or the difference between the respective measurement data. The training images 602 and 604 resulting from the two tools, together with the mismatched CD 608 thereof, can constitute a training set used to train the ML model 610, such as the E2E learning model described above.

Figure 7:
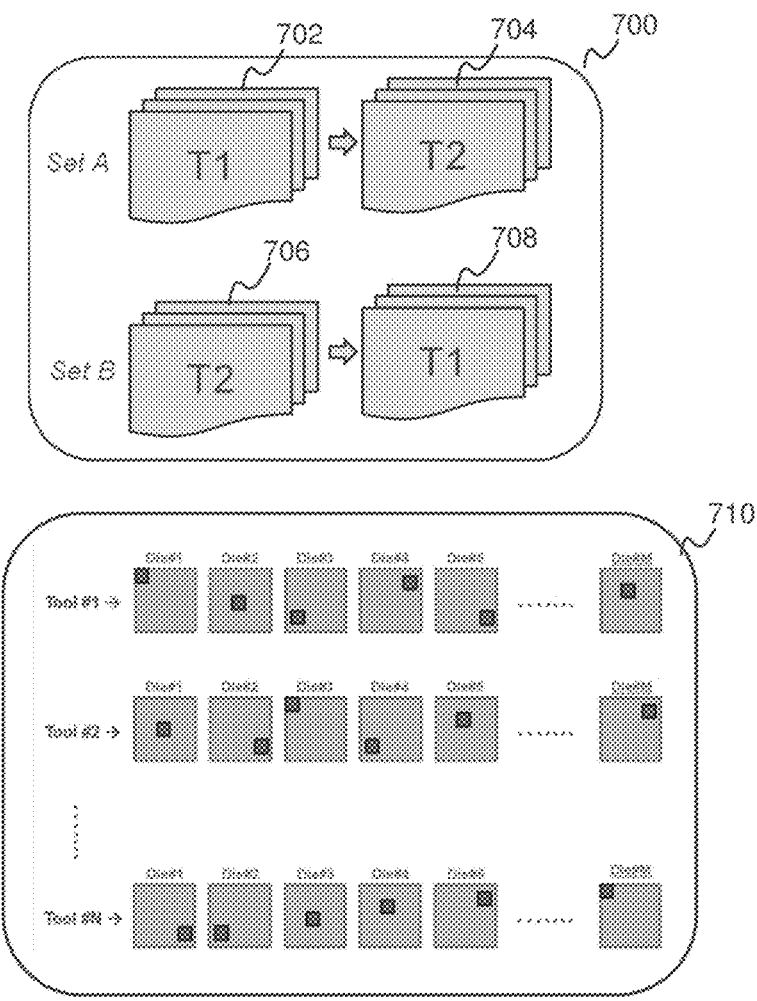
FIG. 7 illustrates two examples of training data collection for tool-to-tool matching in accordance with certain embodiments of the presently disclosed subject matter.

Specifically, FIG. 7 illustrates two examples of training data collection for tool-to-tool matching in accordance with certain embodiments of the presently disclosed subject matter.

The data collection scheme 700 illustrates obtaining two training subsets A and B. Training subset A is obtained by acquiring a first sequence of training images 702 for one or more sites of a given feature on a specimen by Tool 1 (denoted as T1 in the figure), and then acquiring a second sequence of training images 704 for the same one or more sites on the specimen by a different Tool 2 (denoted as T2 in the figure). For instance, in cases where there is one site to be examined on the wafer, Tool 1 can acquire a first sequence of training images for the site, after which the wafer is placed on Tool 2 for acquiring a second sequence of training images for the same site. In cases of multiple sites 1-N to be examined on the wafer, Tool 1 can scan the multiple sites in a specific order and acquire a first sequence of training images for each site. Once the wafer is placed on Tool 2, Tool 2 can scan the sites in the same order and acquire a second sequence of training images for each site.

Training subset B is obtained in a similar manner as described above, only in a reverse order with respect to image acquisition by the two tools. Namely, the specimen is first scanned by Tool 2 and a first sequence of training images 706 are acquired for the one or more sites by Tool 2, following which the specimen is scanned by Tool 1 and a second sequence of training images 708 are acquired for the same sites by Tool 1.

The ML model 610 is trained using a training set comprising both training subsets A and B. Creating two training subsets with respective inspection orders by two tools can serve for the purpose of compensating certain physical effects caused by the sequential scanning process, such as, e.g., charging effects built up on the specimen during the scanning, physical impacts on the specimen, etc. For instance, a specific site on the specimen is repetitively scanned by an electron beam tool, such as SEM, in order to acquire a sequence of images. During the scanning, surface charge caused by the electron beam is continuously accumulated on the site which may cause scanning faults and image artifacts, such as, e.g., gross image distortion and/or image obliteration, etc. The repetitive scanning also physically affects the specimen, and one example of such impact is shrinkage. Such image artifacts and physical impacts can affect the measurement data of the images and lead to an increasing inability to accurately measure critical integrated device dimensions.

Therefore, the images which resulted from a later scan of the site by one tool may suffer from more image artifacts as compared to images from an earlier scan by another tool, due to the accumulated physical effects. When learning a training set including such images, the ML model may be misled and learn such image artifacts as part of the tool-to-tool variance. Using two training subsets acquired from different inspection orders with respect to the two tools (such as the training subsets A and B described above) thus supposedly suffering from opposite image artifacts, can compensate the image artifacts for each other and enable the ML model to learn the actual variance between the tools. The ML model trained in such a way can provide matched measurements with improved accuracy in runtime.

Alternatively, another data collection scheme 710 is illustrated. For multiple tools 1-N, N training subsets are obtained. Specifically, for Tool 1, a first sequence/subset of M images is acquired from M sites of dies 1-M. Each site is selected from a specific location (e.g., sub-die) in a respective die. For instance, as exemplified in the figure, the site from die 1 is selected as the sub-die located at the left upper corner of die 1, the site from die 2 is selected as the center sub-die of die 2, while the site from die 3 is selected as the sub-die located at the left lower part of die 3, etc. For Tool 2, a second sequence of M images is acquired from M sites of the dies 1-M, where the M sites, as an ordered subset, are selected differently from the M sites selected for Tool 1. For instance, the site from die 1 is selected as the central sub-die of die 1, the site from die 2 is selected as the sub-die located at the right lower part of die 2, while the site from die 3 is selected as the sub-die located at the left upper part of die 1, etc. In some cases, the selection of the M sites can be randomized for each tool, as long as, for each die, each site in the die is only scanned once by the N tools. For instance, as illustrated in 710, for die 1, each tool of the multiple tools 1-N scans a different site in the die.

Using training subsets acquired from different sites of the specimen by different tools, as exemplified in 710, can avoid the multiple scanning of the same site, thereby reducing the impacts on measurements caused by physical effects on the specimen and image artifacts, as described above.

Continuing with the description of FIG. 6, once the training set comprising the training images 602 and 604 resulting from the two tools and the mismatched CD 608 therebetween is obtained, the training set can be used to train the ML model 610.

One or more cost functions (also referred to as loss functions) can be specifically configured to evaluate the metrology metric/benchmark of matching. By way of example, a cost function for evaluating matching can be configured by calculating a difference between the training measurement data of different training images acquired by different metrology tools.

By way of example, in the above data collection scheme 700, for training subset A, respective measurements can be obtained for the training images 702 and 704. Similarly, respective measurements can be obtained for the training images 706 and 708 for training subset B. The cost function can be configured as follows:

$$L_{matching} = \text{difference metric}(y_{pred(A)}{}^i, y_{pred(B)}{}^i)$$

The $y_{pred(A)}{}^i$ represents the predicted measurement (i.e., training measurement data) for training image i from training subset A, and the $y_{pred(B)}{}^t$ represents the predicted measurement for a corresponding training image i from training subset B($y_{pred(A)}{}^t$. The ML model is optimized by minimizing the value of the cost function which represents a difference metric for evaluating the differences between the corresponding predicted measurements from the two (or more) training subsets. In some cases, the difference metric can be distance-based. Examples of such a difference metric can include, e.g., Lasso, Ridge regression, Lp-norm (p can be any integer), etc., which are also applicable to the cases of multiple tools (e.g., more than two tools). For instance, in the cases of multiple tools, it can be configured to minimize the distance of each tool's measurements to the average of all tools' measurements.

By way of another example, in the above data collection scheme 710, M predicted measurements can be obtained for the M images acquired by each tool, and an averaged measurement can be derived for each tool based on the M measurements thereof. The cost function can be configured as follows:

$$L_{matching} = f(\text{statistic measure}_{T1}(y_{pred}), \text{statistic measure}_{T2}(y_{pred}))$$

The $y_{pred(A)}{}^t$ statistic measure$_{T1}(y_{pred})$ represents a statistic measure applied on M predicted measurements of Tool 1, such as, e.g., mean, variance, skewness, etc. The statistic measure$_{T2}(y_{pred})$ represents the statistic measure applied on M predicted measurements of Tool 2. The ML model is optimized by minimizing the value of the cost function $f$ which represents the difference between the statistics of the predicted measurements of the two tools. In the cases of multiple tools (e.g., more than two tools), it can be configured to minimize the difference of each tool's statistics to the average of all tools' statistics.

The ML model, once trained using the cost function specifically configured for evaluating matching, can be used in runtime for processing input images from any tool and providing a runtime measurement with reduced tool-to-tool variance (also referred to as a matched measurement).

In some embodiments, in addition to matching, the ML model is optimized to also meet the metrology metric/benchmarks of precision and/or correlation. By way of example, a cost function configured to evaluate precision can be exemplified as follows:

$$L_{precision} = \text{difference metric}(y_1, y_2, \ldots y_n)(y_{pred(A)}{}^t, y_{pred(B)}{}^t)$$

The $y_1$-$y_n$ represents the predicted measurements for n specific runs of scanning a given site. The ML model is optimized by minimizing the value of the cost function which represents a difference metric for evaluating the differences between the predicted measurements of the n specific runs. Similarly as described above, the difference metric can be, e.g., the variance or any Lp-norm (p can be any integer) on the distance of each run's measurements to the multiple runs' average measurements, etc.

For purpose of evaluating correlation, ground truth measurement data need to be provided. As described above, the mismatched CD 608 can represent the respective measurement data of the training images 602 and 604 (which can be obtained, e.g., by processing the training images using the reference metrology algorithm, as described with reference to FIG. 6), and/or the difference between the respective measurements. In some cases, the mismatched CD 608 can serve as ground truth measurement data associated with the training images 602 and 604. By way of example, a cost function configured to evaluate correlation can be exemplified as follows:

$$L_{correlation}=\text{difference metric}(y_{true}, y_{pred})$$

The $y_{pred}$ represents the predicted measurements by the ML model. The $y_{true}$ represents the mismatched CD 608, e.g., the measurement data from the two tools as provided by the reference metrology algorithm 606. The ML model can be optimized by minimizing the value of the cost function which represents a difference metric for evaluating the differences between the predicted measurements and the corresponding ground truth measurements.

It is to be noted that in some cases, the precision and/or correlation can be evaluated for at least one of the multiple tools, although the training images and ground truth data may be available for all tools. For instance, in the example of FIG. 6, in some cases, it can be determined that the precision and/or correlation can be evaluated only for Tool A, or for Tool B.

In some embodiments, the ML model can be optimized to meet the metrology benchmarks of matching, precision and correlation. In such cases, a total cost function of the ML model can comprise various components of specific cost functions configured for specific benchmarks, where respective weights can be applied for the specific cost functions. For instance, the total cost function can be represented as follows:

$$L_{total}=\alpha_1 L_{correlation}+\alpha_2 L_{matching}+\alpha_3 L_{precision}$$

The ML model, once trained using the total cost function configured with the above three components, can be used in runtime for processing input images from any tool and providing runtime measurements without tool-to-tool variance, while at the same time meeting the correlation and precision requirements.

In some cases, optionally, one or more additional loss functions can be added in the total loss function, in addition to or in lieu of the above exemplified components, and the present disclosure is not limited to the specific representation and/or the number of components included in the total cost function.

In some embodiments, one or more additional metrology benchmarks, such as, e.g., sensitivity, can be evaluated in addition to or in lieu of the above exemplified components. Sensitivity refers to how sensitive the measurements are with respect to changes of sizes of the features of a specimen. By way of example, if the feature of the specimen (e.g., width of a structural element) changes from 10 nm to 10.1 nm, high sensitivity indicates that the corresponding measurement should be sensitive to such change of scales, and the measurement result should reflect such change. In cases where the training set includes training images with changing sizes (such as synthesized training images simulated specifically with changing sizes of certain structural elements, as described above) and respective ground truth data thereof, sensitivity can be evaluated.

A cost function for evaluating the criterion of sensitivity can be configured, e.g., by estimating a linear regression function between the plurality of training measurement data and the associated ground truth data. By way of example, the linear regression can be estimated as, e.g., the training measurement data=gain*ground truth+offset.

In some embodiments, the criteria for the one or more metrology benchmarks can be predetermined in accordance with the customer's specification and/or based on previous examination experience.

Once the ML model is trained, the trained ML model can be used in runtime for obtaining runtime measurement data for the specific metrology application.

Turning now to FIG. 3, there is illustrated a generalized flowchart of runtime examination of a semiconductor specimen using a trained ML model for a metrology application in accordance with certain embodiments of the presently disclosed subject matter.

A runtime image of a semiconductor specimen can be obtained (302) (e.g., by the examination tool 120) during runtime examination of the specimen.

The runtime image can be provided (304) as an input to an end-to-end (E2E) learning model (e.g., the ML model 108 in PMC 102) to process, thereby obtaining, as an output of the E2E learning model, runtime measurement data specific for a metrology application. The ML model is previously trained for a specific metrology application in accordance with the process described above with reference to FIGS. 2 and 4. As described above, the E2E learning model can be implemented using various ML models. By way of example, the E2E learning model is implemented as a CNN.

Specifically, the ML is previously trained using a training set comprising a plurality of training images of the specimen and respective ground truth measurement data associated therewith, and one or more cost functions specifically configured to evaluate, for the plurality of training images and corresponding training measurement data outputted by the E2E learning model, one or more metrology benchmarks. The one or more metrology benchmarks can be selected from a group comprising precision indicative of repeatability of training measurement data of different training images acquired for a given feature on the specimen by one metrology tool, correlation between training measurement data of the training images and the respective ground truth measurement data associated therewith, and matching indicative of repeatability of training measurement data of different training images acquired for the given feature by different metrology tools.

According to certain embodiments, in cases where the ML model is trained for evaluating the metrology benchmark of matching, as described above with reference to FIG. 6, the present disclosure contemplates a computerized metrology system and method for examining a semiconductor specimen, comprising obtaining a runtime image of the semiconductor specimen, and providing the runtime image as an input to an end-to-end (E2E) learning model to process, thereby obtaining, as an output of the E2E learning model, runtime measurement data specific for a metrology application with reduced tool-to-tool variance. The E2E learning model is previously trained for the metrology application using a training set comprising at least two sequences of training images acquired by at least two metrology tools, and at least one cost function specifically configured to evaluate tool-to-tool matching between the at least two tools based on training measurement data of the at least two sequences of training images, the matching indicative of repeatability/variance of the training measurement data of the at least two sequences of training images. Optionally, one or more additional cost functions can be added to evaluate additional metrology benchmarks, such as precision and/or correlation, etc.

In some embodiments, optionally, the presently disclosed metrology system can be further configured to provide explainability/interpretability with respect to the runtime measurement data. By way of example, the interpretability can be provided by a heatmap visually representing a correlation of pixel contribution of the runtime image and the runtime measurement data (or between a training image and the corresponding training measurement data).

By way of example, such a heatmap can be provided by using one of the following tools/algorithms: Local Interpretable Model-Agnostic Explanations (LIME), SHapley Additive explanation (SHAP), and Gradient-weighted Class Activation Mapping (Grad-CAM). Such algorithms can be used to visualize the class activation maps of a ML model such as a Convolutional Neural Network (CNN), thereby allowing to verify whether the network is "looking" at the correct locations/patterns of the input image, which neurons are activated in the forward-pass during inference/prediction, and how the network arrived at its final output. For instance, Grad-CAM works by finding the final convolutional layer in the network and examining the gradient information flowing into the final layer. Based on the output heatmap, it is possible to understand if the network is properly learnt and whether to collect additional training data and repeat the training process.

By way of example, for an input image representative of a structural element such as a contact, the heatmap as provided can highlight the pixels of interest that have high contribution/influence to the output of the ML model. For instance, in cases where the application is CD metrology application, where the ML model is configured to provide CD measurements based on the input image, such as, e.g., the diameter of the contact, the heatmap as provided, e.g., by the Grad-CAM, can highlight a range of pixels that are in proximity to the edge of contact and represent an edge profile (in some cases as a 3D profile of the edge) of the contact. The heatmap can provide an indication that the ML model "looked" at a wide range of pixels in the image to derive the conclusions other than only relying on the limited contour information, as is normally the case in the reference metrology system.

According to certain embodiments, the E2E learning model can be implemented as a multi-task learning model directed to multiple metrology applications. By way of example, the multi-task learning model can be generally implemented by sharing certain hidden layers in a DNN between all tasks, while keeping several task-specific output layers for different tasks. Using such a learning model enables learning multiple learning tasks in parallel, sharing representations between related tasks, and utilizing information in the training signals of related tasks, thereby resulting in improved learning efficiency and prediction accuracy for the task-specific layers, when compared to training models for respective tasks separately. For instance, the E2E learning model may be implemented as a multi-task learning model directed to a CD metrology application, an overlay application, and a CDU application. In such cases, multiple training sets, or a training set with multiple ground truth data, should be prepared in accordance with the multiple metrology applications.

In some cases, the examination tool is an electron beam tool such as SEM. A SEM image can be generated by aggregating a sequence of frames sequentially captured for an area of the semiconductor specimen by SEM. In order to obtain a SEM image with higher quality (e.g., higher signal-to-noise ratio (SNR)), the number of frames captured for the area has to reach a certain amount so as to reduce noise in the resultant image. In particular, in the reference metrology system 504 as described above, the accuracy of the image segmentation heavily relies on the quality of the acquired images. Therefore, an input SEM image usable for the reference system 504 requires the SEM tool to capture a relatively large number of frames, such as, e.g., 64-96 frames, which consumes a lot of burst time of the tool, thus decreasing the examination throughput. Using the presently disclosed metrology system 524, which does not rely on image segmentation, can significantly reduce the number of frames needed (e.g., from 96 frames to 16 frames), thereby substantially reducing the burst time by a number of times, and improving tool throughput.

It is to be noted that examples illustrated in the present disclosure, such as, e.g., the exemplified metrology applications, the exemplified metrology benchmarks, the multiple processing modules in the reference metrology system, the exemplified physical effects, image simulation and augmentation techniques etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing an optimized metrology system using an E2E learning model replacing a chain of processing modules used in a reference metrology system, thereby allowing using a single optimization criterion directly correlated to the metrology benchmarks, instead of each of the multiple modules being optimized separately under different criteria. Such system architecture is straightforward with reduced complexity, enables direct optimization based on the metrology benchmark evaluation, minimizes the necessity of user intervention and dependency, thus effectively improving the measurement performance. By way of example, the metrology benchmarks, such as precision and correlation of the proposed metrology system, are proven to be significantly improved by a few times as compared to the reference metrology system.

In particular, such system design does not rely on image segmentation, thus saving computation power and resources used for tuning and optimizing the segmentation module. In addition, avoiding image segmentation can also significantly reduce the number of frames acquired for each input image (e.g., from 96 frames to 16 frames), thereby substantially reducing burst time of the tool by a few times, and improving tool throughput.

Among further advantages of certain embodiments of the presently disclosed subject matter as described herein is an optimized metrology system capable of providing runtime measurement data, with reduced tool-to-tool variance. This is enabled by training the E2E learning model in the metrology system to meet the tool-to-tool matching benchmark using a training set and one or more cost functions specifically configured therefor. Optionally, one or more additional cost functions can be added for training the learning model to meet the precision and/or correlation benchmarks in addition to the tool-to-tool matching. The learning model trained in such way can provide measurement data with reduced tool-to-tool variance while meeting the precision and/or correlation criteria.

Among further advantages of certain embodiments of the presently disclosed subject matter as described herein is generating sufficient training data for training the E2E learning model, including synthesized training images simulated based on design data of the specimen. The simulation and augmentation can simulate one or more effects/variations caused by one or more physical processes, such as the fabrication process and/or examination process of the specimen, thus increasing the variety of the training data with a controlled amount of variance. In addition, by automatically generating simulated ground truth data for the simulated images, the accuracy of ground truth data can also be improved.

Using the enriched training set to train the E2E learning model can reduce the impact of interfering effects on the trained model and improve robustness and effectiveness of implementing the trained model for different applications.

Among further advantages of certain embodiments of the presently disclosed subject matter as described herein is the interpretability provided by a heatmap visually representing a correlation of pixel contribution of the runtime image and the runtime measurement data. Such a heatmap can be provided by using a Gradient-weighted Class Activation Mapping (Grad-CAM) algorithm. This ability allows to verify whether the network is "looking" at the correct locations/patterns of the input image, and how the network arrived at its final output, thus understanding if the network is properly learnt and whether to collect additional training data and to repeat the training process.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized metrology system for examining a semiconductor specimen, the system comprising:
   an examination tool configured to acquire a runtime image of the semiconductor specimen; and
   a processing and memory circuitry (PMC) operatively coupled to the examination tool and configured to provide the runtime image as an input to an end-to-end (E2E) learning model to process, thereby obtaining, as an output of the E2E learning model, runtime measurement data specific for a metrology application, wherein the E2E learning model is previously trained for the metrology application using:
   a training set comprising a plurality of training images of the specimen and respective ground truth measurement data associated therewith; and
   one or more cost functions specifically configured to evaluate, for the plurality of training images and corresponding training measurement data outputted by the E2E learning model, one or more metrology benchmarks from a group comprising: precision indicative of repeatability of first training measurement data of first different training images of the plurality of training images acquired for a given feature on the specimen by one metrology tool, correlation between the corresponding training measurement data of the plurality of training images and the respective ground truth measurement data associated therewith, and matching indicative of repeatability of second training measurement data of second different training images of the plurality of training images acquired for the given feature by different metrology tools,
   wherein the runtime measurement data has improved measurement performance with respect to the one or more metrology benchmarks.

2. The computerized metrology system according to claim 1, wherein the E2E learning model is a single machine learning (ML) model configured to directly derive the runtime measurement data based on the runtime image, the single ML model usable to replace a plurality of processing modules used in a reference metrology system comprising an image preprocessing module, an image segmentation module, and a measurement module.

3. The computerized metrology system according to claim 2, wherein the runtime image is acquired by an electron beam tool, and a burst time of the electron beam tool used to capture the runtime image is reduced with respect to the burst time used for capturing an input image for the reference metrology system.

4. The computerized metrology system according to claim 1, wherein the training set comprises at least two sequences of training images acquired by at least two metrology tools, and wherein the one or more cost functions comprises a given cost function specifically configured to evaluate said matching between the at least two tools metrology based on respective training measurement data of the at least two sequences of training images.

5. The computerized metrology system according to claim 4, wherein each sequence of the at least two sequences of training images is acquired by a respective metrology tool of the at least two metrology tools to capture a respective sequence of sites of the given feature on the specimen, and wherein the given cost function represents a difference between averaged measurement data of respective training measurement data of the at least two sequences of training images.

6. The computerized metrology system according to claim 4, wherein the training set comprises a first subset and a second subset, the first subset comprising a first sequence of training images acquired by a metrology tool for one or more sites of the given feature on the specimen, and a second sequence of training images acquired by a different metrology tool for the one or more sites after acquisition of the first sequence, and the second subset comprising a first sequence of training images acquired by the different metrology tool for the one or more sites, and a second sequence of training images acquired by the metrology tool for the one or more sites after acquisition of the first sequence, and wherein the given cost function represents a difference between respective training measurement data of corresponding training images in the first subset and the second subset.

7. The computerized metrology system according to claim 4, wherein the one or more cost functions further comprise at least one additional cost function specifically configured to evaluate at least one of said precision or said correlation for at least one metrology tool.

8. The computerized metrology system according to claim 1, wherein the metrology application is one of: Critical Dimension (CD) metrology, Overlay (OVL), Measurement-Based Inspection (MBI), Critical Dimension Uniformity (CDU), CAD Awareness (CADA), and Lithography process control.

9. The computerized metrology system according to claim 1, wherein the training set comprises one or more synthetic images simulated based on design data of the semiconductor specimen and ground truth measurement data automatically generated therefor.

10. The computerized metrology system according to claim 9, wherein the one or more synthetic images are generated by performing simulation based on the design data of the semiconductor specimen, giving rise to one or more simulated images, and performing augmentation on the simulated images, thereby simulating one or more physical effects of one or more physical processes of the specimen.

11. The computerized metrology system according to claim 1, wherein the ground truth data comprises one or more of: measurement data generated by processing the plurality of training images using a reference metrology system comprising multiple processing modules, measurement data obtained from a customer based on a testing specimen, and measurement data automatically generated for simulated images.

12. The computerized metrology system according to claim 1, wherein the PMC is further configured to provide interpretability with respect to the runtime measurement data.

13. The computerized metrology system according to claim 12, wherein the interpretability is provided by a heatmap visually representing a correlation of pixel contribution of the runtime image and the runtime measurement data.

14. The computerized metrology system according to claim 1, wherein the E2E learning model is a multi-task learning model directed to multiple metrology applications.

15. A computerized method, the method comprising:
generating a training set comprising a plurality of training images of a semiconductor specimen and respective ground truth measurement data associated therewith pertaining to a metrology application; and
training an end-to-end (E2E) learning model for the metrology application using the training set and one or more cost functions, the one or more cost functions specifically configured to evaluate, for the plurality of training images and corresponding training measurement data outputted by the E2E learning model, one or more metrology benchmarks from a group comprising: precision indicative of repeatability of first training measurement data of first different training images of the plurality of training images acquired for a given feature on the specimen by one metrology tool, correlation between the corresponding training measurement data of the plurality of training images and the respective ground truth measurement data associated therewith, and matching indicative of repeatability of second training measurement data of second different training images of the plurality of training images acquired for the given feature by different metrology tools;
wherein the E2E learning model, upon being trained, is usable for processing a runtime image of the semiconductor specimen and obtaining runtime measurement data specific for the metrology application.

16. The computerized method according to claim 15, wherein the E2E learning model is a single machine learning (ML) model configured to directly derive the runtime measurement data based on the runtime image, the single ML model usable to replace a plurality of processing modules used in a reference metrology system comprising an image preprocessing module, an image segmentation module, and a measurement module.

17. The computerized method according to claim 16, wherein the runtime image is acquired by an electron beam tool, and a burst time of the electron beam tool used to capture the runtime image is reduced with respect to the burst time used for capturing an input image for the reference metrology system.

18. The computerized method according to claim 15, wherein the training set comprises at least two sequences of training images acquired by at least two metrology tools, and wherein the one or more cost functions comprises a given cost function specifically configured to evaluate said matching between the at least two metrology tools based on respective training measurement data of the at least two sequences of training images.

19. The computerized method according to claim 18, wherein each sequence of the at least two sequences of training images is acquired by a respective metrology tool of the at least two metrology tools to capture a respective sequence of sites of the given feature on the specimen, and wherein the given cost function represents a difference between averaged measurement data of respective training measurement data of the at least two sequences of training images.

20. A non-transitory computer readable storage medium tangibly embodying a program of instructions that, when executed by a computer, cause the computer to perform a metrology method for examining a semiconductor specimen, the method comprising:
obtaining, by an examination tool, a runtime image of the semiconductor specimen; and
providing, by a processing and memory circuitry (PMC) operatively coupled to the examination tool, the runtime image as an input to an end-to-end (E2E) learning model to process, thereby obtaining, as an output of the E2E learning model, runtime measurement data specific for a metrology application, wherein the E2E learning model is previously trained for the metrology application using:
a training set comprising a plurality of training images of the specimen and respective ground truth measurement data associated therewith; and
one or more cost functions specifically configured to evaluate, for the plurality of training images and corresponding training measurement data outputted by the E2E learning model, one or more metrology benchmarks from a group comprising: precision indicative of repeatability of first training measurement data of first different training images of the plurality of training images acquired for a given feature on the specimen by one metrology tool, correlation between the corresponding training measurement data of the plurality of training images and the respective ground truth measurement data associated therewith, and matching indicative of repeatability of second training measurement data of second different training images of the plurality of training images acquired for the given feature by different metrology tools, wherein the runtime measurement data has improved measurement performance with respect to the one or more metrology benchmarks.

* * * * *